United States Patent [19]
Yoshinobu

[11] Patent Number: 5,606,726
[45] Date of Patent: Feb. 25, 1997

[54] RECEIVING UNIT FOR A TWO-WAY BROADCASTING SYSTEM

[75] Inventor: Hitoshi Yoshinobu, Kanagawa, Japan

[73] Assignee: Sony Corporation, Tokyo, Japan

[21] Appl. No.: 395,730

[22] Filed: Feb. 28, 1995

[30] Foreign Application Priority Data

Mar. 4, 1994 [JP] Japan ................... 6-060214
Jun. 24, 1994 [JP] Japan ................... 6-166194

[51] Int. Cl.⁶ ........................................ H04N 7/173
[52] U.S. Cl. ........................... 455/5.1; 455/2; 348/1; 348/12
[58] Field of Search .................. 348/1, 2, 12, 13, 348/6, 7, 8, 10; 455/4.2, 2, 5.1; 379/92, 106, 107, 40, 51, 88, 89, 67; H04N 7/16, 7/173

[56] References Cited

U.S. PATENT DOCUMENTS

| | | | |
|---|---|---|---|
| 4,355,372 | 10/1982 | Johnson et al. | 379/92 |
| 4,584,602 | 4/1986 | Nakagawa | 348/1 |
| 4,829,558 | 5/1989 | Welsh | 348/1 |
| 4,847,886 | 7/1989 | Chumley | 379/56 |
| 5,012,510 | 4/1991 | Schaubs et al. | 348/6 |

*Primary Examiner*—John K. Peng
*Assistant Examiner*—Chris Grant
*Attorney, Agent, or Firm*—Lise A. Rode, Esq.; Jerry A. Miller

[57] ABSTRACT

In two-way broadcasting, the broadcasting side broadcasts a broadcast signal multiplexed with information for identifying a no-ringing response function of the destination. When the destination has the no-ringing response function, the receiving side dials the no-ringing dialing number before the telephone number of the destination on the basis of the function identifying information. Thus, a telephone service station transmits the specified no-ringing dialing signal such as an NCNG or NRS signal. Moreover, when a broadcasting side having a plurality of destinations corresponding to a plurality of replies broadcasts a signal multiplexed with the information for identifying a plurality of destinations corresponding to a plurality of the replies, the receiving side selectively dials a plurality of the destinations on the basis of the destination identifying information, and terminates the line connection upon reception of the signal.

4 Claims, 5 Drawing Sheets

SPECIFICATION OF DTMF SIGNAL IN TELEPHONE LINE

| ITEM | ALLOWABLE RANGE |
|---|---|
| SIGNAL TRANSMITTING TIME | 50 m sec  MORE |
| MINIMUM PAUSE (MINIMUM VALUE OF PAUSE TIME BETWEEN ADJACENT SIGNALS) | 30 m sec  MORE |
| PERIOD (SIGNAL TRANSMITTING TIME + MINIMUM PAUSE) | 120 m sec  MORE |

FIG. 4

RECEIVING UNIT FOR A TWO-WAY BROADCASTING SYSTEM

BACKGROUND OF THE INVENTION

The present invention relates to a two-way broadcasting system and a receiving unit therefor. More particularly, the present invention relates to a broadcast system and receiver which are capable of providing interactive communications over a telephone line.

Two-way television broadcast systems have been proposed in which a telephone number is transmitted from a television broadcast station and superimposed over the video picture on the viewer's television display screen. Viewers are then asked to respond via telephone or facsimile within a preselected time. Such system is commonly found in television shopping programs, quiz shows, polling surveys, or similar such programs which require view participation. Viewers then respond by phoning in their replies via telephone, facsimile or the like. Such a system has been proposed in the U.S. patent application entitled "Multiplex Broadcasting System", Ser. No. 08/355,132, filed Dec. 13, 1994 and the U.S. patent application entitled System and Method For Responding To Two-Way Broadcast Programs (Hidoshi Yoshinobu), Ser. No. 08/395,253, filed Feb. 28, 1995, both of which are assigned to the assignee of this application and which are incorporated by reference herein.

The above two-way broadcasting system, however, has the following disadvantages: First, when a viewer dials the displayed telephone number in order to send a reply via the above two-way broadcast program, the number dialed may be improperly switched and thus the wrong number reached. Additionally, under the above system, the viewer generally makes a request orally and then awaits a reply confirming his request and/or receipt of his call. This generally takes a considerable amount of time which increases the cost of the telephone call to the viewer and increases the load applied to the telephone line.

A solution to these problems has been proposed in Japan by Nippon-Telephone and Telegraph Company (NTT) via a service called "Tele-gong™" from a telephone service station.

The operation of the "Tele-gong™" system may be examined as follows: During a viewer participation type quiz program, accepting telephone numbers are assigned to receive a plurality of replies in response to one question. The number of replies transmitted from viewers through their respective individual telephone numbers are counted and collected at each telephone service station on the transmitting side, and then a signal representing the collected data is sent to the broadcasting station side. Upon the reception of that signal, the transmission of the viewer's reply is substantially completed and the call can be terminated which again reduces the circuit load. Furthermore, the participating viewer can also place the telephone in the on-hook state directly after the reception of the signal, and thereby reduce the cost of his telephone call.

In the "Tele-gong™" system, however, the viewer must dial a long telephone number to access the system. For example, the viewer may be required to dial a 10 digit number such as 0180-XX-XXXX in order to transmit a first reply. If the viewer forgets the correct number to be dialed, or dials the number incorrectly, he has wasted a sometimes costly call and has needlessly added to the telephone circuit load.

An additional disadvantage with the "Tele-gong™" system is that while the telephone line can be cut-off directly after the reception of the signal, the viewer often listens to message(s) transmitted via the system, and thereby does not hang up the telephone until the transmitted message(s) are completed and the "Tele-gong™" side hangs up.

Furthermore, in the case where the viewer accidentally dials a telephone number different from the accepting telephone number, a third party having that telephone number actually dialed by the viewer, (and similar to the accepting telephone number) frequently receives unwanted and irritating calls.

To prevent the above problems involving misdialing, it has been suggested that the broadcasting side broadcast a main broadcast signal multiplexed with information such as access data related to the program for two-way broadcasting, and that the receiving side then stores that information separate from the demodulated broadcast signal in memory to utilize the information for automatic dialing.

Even with this method, however, there is concern that the destination telephone number is still not correctly dialed and received due to the potentially poor quality of the receiving state.

SUMMARY OF THE INVENTION

An object of the present invention therefore, is to provide a receiving unit for interactive communications over a two-way broadcasting system. Another object of the present invention is to provide a receiving unit for a two-way broadcasting system which easily and efficiently avoids the problems of misdialing or misrouting of a viewer dialed telephone call, thereby avoiding the troubling of a third party, the wasted expense of a phone call, and the useless load applied on a telephone line.

In order to achieve the above objects, according to a first aspect of the present invention, there is provided a two-way broadcasting system wherein the broadcasting side broadcasts a program which requests replies from viewers, and wherein the receiving side transmits the reply including reply information to a specified destination by way of a telephone line, and further wherein the broadcasting side broadcasts a main broadcast signal multiplexed with information for identifying the presence or absence of the no-ringing responsive function of the destination, and wherein the receiving side separates the no-ringing responsive function identifying information from the received signal and stores the information in memory, and then dials a specified number corresponding to the no-ringing responsive function before the telephone number of the destination.

According to a second aspect of the present invention, there is provided a two-way broadcasting system wherein the broadcasting side broadcasts a program which requests viewers to select a plurality of replies in response to a question posed from the broadcasting side, and the receiving side transmits the information of replies to a specified destination by way of a telephone line, and further wherein the broadcasting side broadcasts a main broadcast signal multiplexed with information for identifying the presence or absence of a plurality of destinations corresponding to a plurality of the replies, and wherein the receiving side separates the destination identifying information from the received signal, stores the information in memory, and selectively dials a plurality of the destinations through the telephone line.

According to a third aspect of the present invention, there is provided a receiving unit for a two-way broadcasting system, the receiving unit including means for receiving a broadcast signal, and means for transmitting to a specified destination through a telephone line, the reply information transmitted in response to a question proposed from the broadcasting side, comprising means for separating and reproducing the information which identifies the presence or absence of a no-ringing responsive function of the destination from the broadcast signal, both of which are multiplexed in the received broadcast signal, and means for incorporating the reproduced responsive function identifying information whereby a specified number corresponding to the no-ringing responsive function is dialed before the telephone number of the destination is dialed on the basis of the incorporated information.

According to a fourth aspect of the present invention, there is provided a receiving unit for a two-way broadcasting system said receiving unit including means for receiving a broadcast signal, and means for transmitting to a specified destination through a telephone line, a plurality of reply information transmitted in response to a question proposed from a broadcasting side, comprising means for separating the information identifying the presence or absence of a plurality of destinations corresponding to a plurality of the replies from the broadcast signal, both of which are multiplexed in the received broadcast signal for, and for reproducing the information, and means for incorporating the reproduced destination identifying information, whereby a plurality of the destinations are selectively dialed by the transmitting means on the basis of the incorporated destination identifying information.

No-ringing replying or no-ringing dialing is known in automatic probe checking systems, such as those systems connected to the telephone network using an NRS signal, or a facsimile communication systems connected through an exclusive network called "F net" using an NCNG signal.

According to the present invention, the broadcasting side broadcasts information related to the no-ringing reply by adding same to the sub-broadcast information. The receiving side of the system interrogates the receiver as to whether or not the telephone service station in the area where the receiver is located provides such non-ringing dialing service. In the case where the destination telephone receiver does not have the no-ringing function, but the telephone service station in the area where the receiver is located provides the no-ringing dialing service, the receiving side dials the no-ringing dialing number before the telephone number of the destination on the basis of the function-identifying information transmitted from the broadcasting side. Thus, the telephone service station transmits a no-ringing dialing signal corresponding to the function of the destination, and therefore only that destination having a specified function receives the signal. This helps make it possible to avoid problems due to misdialing by automatically dialing the data only to the destination corresponding to the selected reply.

In the case where the broadcasting side has a plurality of destinations corresponding to a plurality of replies, the receiving side selectively dials a plurality of destinations on the basis of the destination identifying information transmitted from the broadcasting side, thereby making it possible to reduce misdialing. Furthermore, as the line is cut off directly after the reception of the signal, the load applied to the telephone line is reduced.

DETAILED DESCRIPTION OF THE PREFERRED EMBODIMENT

Hereinafter, the preferred embodiment of a two-way broadcasting system and a receiving unit therefor according to the present invention will be described with reference to the drawings.

In the preferred embodiment of the invention, the broadcasting station side of the system structures the information related to programs as sub-broadcast information in the form of a DTMF signal, and then broadcasts a main broadcast audio signal multiplexed (mixed) with the DTMF signal. Upon receipt of the resultant signal, the receiving side separates the DTMF signal from the received broadcast audio signal, decodes the DTMF signal, reproduces the information related to programs, and stores the information in a memory. The information thus stored is used for the telephone communication with the telephone service station or for reserving a program.

In this embodiment, the information related to the non-ringing responsive function of a telephone receiving equipment of the broadcasting station side is also broadcast with the above sub-broadcasting information.

No-ringing Dialing

The telephone communication system of a no-ring reply or no-ring dialing will now be described.

In the aforementioned automatic probe checking systems such as used for power, gas and water lines or the like, a modem having a no-ring receiving function and using a NRS (No-Ringing Selection Tone) signal is incorporated in a meter for checking the probe through a telephone line connected to the meter. (The NRS signal is a single tone signal having a frequency of 2080 Hz.) When a subscriber dials a specified identifying number before the destination telephone number, the telephone service station transmits an NRS signal.

Similar to this system, it is known that a facsimile communication is made over an exclusive network called an "F net", and when the transmitting side performs a no-ringing dialing using an NCNG (No CalliNG Tone) signal, and if the receiving facsimile machine has the no-ringing receiving function, the receiving side can receive the data without causing the telephone or facsimile to ring, even if a telephone receiver is connected to the facsimile line. The NCNG signal is a single tone signal at a frequency of 1300 Hz. When a subscriber dials a specified identifying number before the destination telephone number, the telephone service station transmits an NCNG signal.

The above no-ringing dialing is made possible in those areas where telephone service stations have telephone equipment capable of providing no-ringing dialing service. Such service stations exist mainly in urban areas.

As described above, one of the main problems caused by the misdialing of a wrong number, is the ringing of a wrong party's line. This problem can be avoided in the present invention, since the telephone receiving equipment on the broadcasting side of the present invention has the no-ringing responsive function. The operation of said receiving unit will be described in detail later.

DTMF Signal

Figure 2:
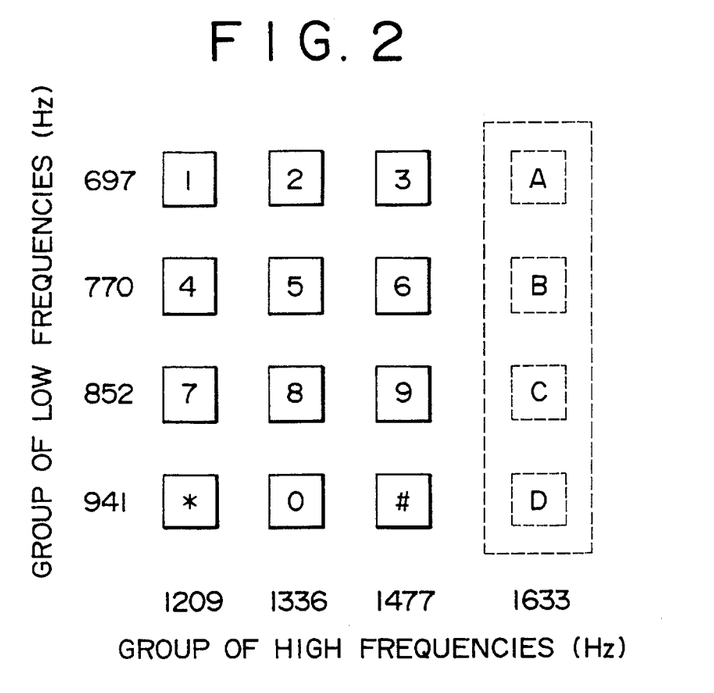
FIG. 2 is a diagram explaining a DTMF signal.

Referring now to FIG. 2, a DTMF signal similar to that used in the preferred embodiment of the present invention will be described.

The DTMF signaling system is an audio band signaling system which simultaneously sends two tones, one being a group of low frequencies (the low group) and the other being a group of high frequencies (the high group). In Japan, each of the groups of low frequencies and high frequencies comprises four tones of audio band frequencies, any two of which are not in a harmonic relation with each other. (In the U.S. the high frequency group comprises three radio band frequencies, as push buttons A–D are not currently provided on telephones within the U.S. For purposes of this invention, the Japanese DTMF system will be discussed; however, it will be understood that the U.S. DTMF signalling protocol is substantially similar to that of the Japanese protocol.)

In the DTMF signal, the four frequencies of the low group generally comprise 697 Hz, 770 Hz, 852 Hz, and 941 Hz, for example, while the four frequencies of the high group generally comprise 1209 Hz, 1336 Hz, 1477 Hz, and 1633 Hz, for example. One frequency each is taken from the low groups and the high group and these frequencies are then combined to produce a DTMF tone. The DTMF signals (each of which is referred to as a function signal hereinafter) comprising such combinations are thereafter assigned to push buttons "0"–"D" arranged in four rows and four columns as shown in FIG. 2.

For telephone communications, however, only 12 of the 16 possible DTMF signal combinations are generally used as the signals for the subscriber's address (i.e., the subscriber's telephone number). More specifically, of the 12 combinations, ten are assigned to the numbers "0"–"9" and two are assigned to the symbols "*" and "#". The function signals corresponding to characters "A", "B", "C" and "D" indicated in FIG. 2 by broken lines are not generally used for subscriber line selection in Japan but are used rather for data transmission utilizing a push button (PB) dial.

Figure 3:
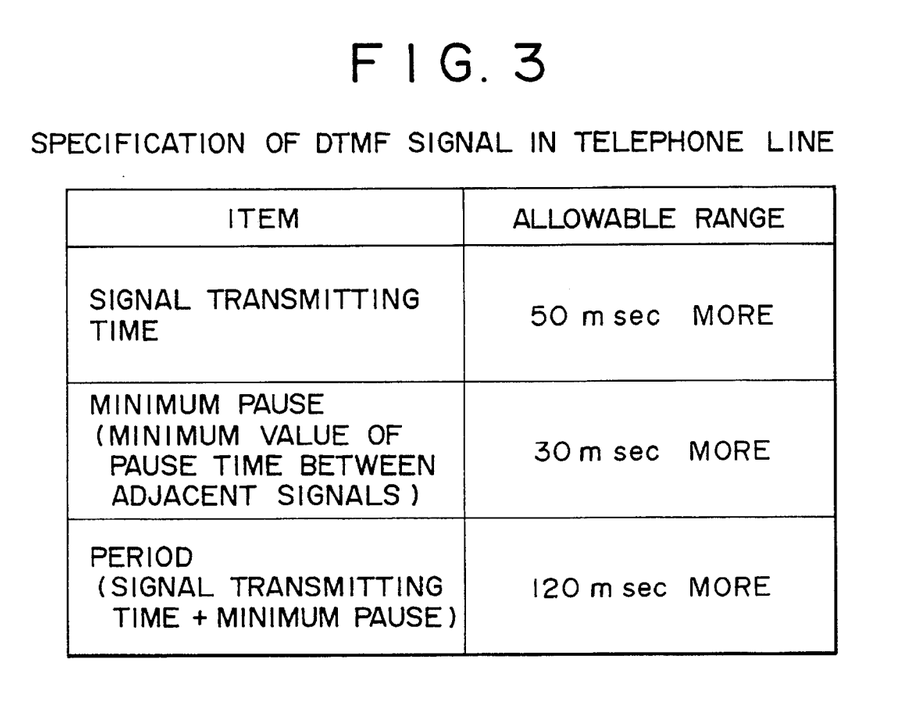
FIG. 3 is a diagram explaining the transmission specifications of a DTMF signal in Japan.

The specifications for transmitting the signals for line selection purpose are specified for the Japanese telephone system as shown in FIG. 3.

Because of the combination of two frequencies and the transmission specifications described above, the DTMF signal can be clearly distinguished from natural sounds such as the human voice. As a result, the DTMF signal can be thus broadcast while being multiplexed (mixed) with an ordinary broadcast audio signal and, on the receiving side, it can be separated relatively easily.

It is also known that the DTMF signal protocol is used in conjunction with multifunction telephone service. For example, by operating the push buttons of a telephone receiver located far away from home, it is possible to reproduce those messages recorded in an answering machine at home, to record or reproduce messages on the machine, or to erase a received message stored therein.

Broadcasting of Sub-broadcast Information

According to one aspect of the present invention, during transmission of sub-broadcast information, the transmitting side in the preferred embodiment, that is, the broadcasting station side, uses the function signals "A", "B" and "C", of the function signals "A", "B", "C" and "D" as transmission starting information of the sub-broadcast information, and uses the function signal "D" as transmission ending information.

Since three functional signals "A", "B" and "C" are available as transmission starting information, three distinct kinds of sub-broadcast information can be transmitted. For example, information about reply access to a two-way program, i.e., sub-broadcast information such as the telephone number to be accessed (the accepting telephone number) and the transmission rate, may be placed between the function signal "A" as the transmission starting information and the function signal "D" as the transmission ending signal. Sub-broadcast information for setting environmental conditions, such as restrictions on the telephone numbers on the reply side (e.g., by the last digit of the telephone number) and the setting of the current time, may be placed between the function signal "B" and the function signal "D". Similarly, information about the clearing of received data may be placed between the function signal "C" and the function signal "D". These signals are then broadcast after being multiplexed with an ordinary broadcast signal.

Upon receiving the multiplexed signal, the receiving side of the present invention recognizes as a train of sub-broadcast data the numeric and symbolic data placed between any of the function signals, and further recognizes the "A", "B" and "C" function signals as transmission starting information, and the function signal "D" as transmission ending information. These sub-broadcast data are stored at predetermined and distinct storage areas of memory, as will be described later.

For example, with respect to reply access information, when a receiver whose interactive television specification version is 00 is allowed to access at a transmission rate of 30 bps, an accepting telephone number such as 0990-1234-1234, the sub-broadcast information may have a train of data formed of such DTMF function signals as:

00#0990*1234*1234 demarcated by the function signal "A" at one end and the function signal "D" at the other end. Such train is transmitted after being multiplexed with a main broadcast audio signal. Of the train of data, the data 00 at the start indicates that the interactive television specification version is 00 (the transmission rate is 300 bps) and the numeric data after the symbol "#" indicates the accepting telephone number.

When a receiver whose interactive television specification version is 01 is allowed to access at a transmission rate of 1200 bps, an accepting telephone number such as 0990-1234-1235, a train of data formed of such DTMF function signals as:

01#0990*1234*1235 demarcated by the function signal "A" at one end and the function signal "D" at the other end, will be transmitted after being multiplexed with a main broadcast audio signal. At this time, the data 01 at the start of the train of data indicates that the interactive television specification version is 01 (the transmission rate is 1200 bps) and the numeric data after the symbol "#" indicates the accepting telephone number. (With respect to the reply access data as described above, the symbol "#" represents a separator (a partition between individual data) and the symbol "*" represents a pause.)

Turning now to the environmental setting information, in a case where access is limited only to viewers with specific telephone numbers (subscriber line number), for example when telephone numbers whose last digit is 0 only are allowed to access, a train of data formed of such function signals as 0#0, is demarcated by the function signal "B" at one end and the function signal "D" at the other end, and then transmitted after being multiplexed with a main broadcast audio signal. Similarly if only those telephone numbers having a last digit of "1" are allowed to access, the train of data might be 0#1. In this case, the numeral ")" before the symbol "#" means that the telephone numbers having the numeral following the symbol "#" as the last digit are allowed to access.

Additionally, a preselect group of telephone numbers might be allowed to access. For example, when only those telephone number whose last digits are even are allowed to access, a train of data formed of such DTMF function signals as:

0#0*0#2*0#4*0#6*0#8 demarcated by the function signal "B" at one end and the function signal "D" at the other end are transmitted after being multiplexed with a main broadcast audio signal. In this case, the symbol "*" means the logical sum.

With respect to information regarding reservation of reception or of recording of a broadcast program, for example when the current time is "1993.12.15, Tuesday, 7:00", a train of data formed of such DTMF function signals as:

1#1993121520700 demarcated by the function signal "B" at one end and the function signal ,"D" at the other, is transmitted after being multiplexed with a main broadcast audio signal.

Thus, if a broadcast program will be broadcast from 7:00 to 7:29 next Sunday, a train of data formed of such DTMF function signals as:

10#07000729 demarcated by the function signal "B" and the function signal "D" is transmitted. If, however, an additional broadcast program Will be broadcast from 12:00 to 14:15 next Monday, a train of data formed of such DTMF function signals as:

11#12001415 demarcated by the function signal "B" and the function signal "D" is transmitted. (In trains of data about environmental settings as described above, the symbol "#" represents a separator and the symbols "*" represents "OR" (the logical sum)).

To clear restrictions on received data or access thereto, for example in the case where a restriction of replying telephone numbers is cleared, a train of data formed of such DTMF function signals as:

99#0 demarcated by the function signal "C" and the function signal "D" are transmitted. In the case where the accepting telephone number is cleared, a train of data formed of such DTMF function signals as:

99#1 demarcated by the function signal "C" and the function signal "D" are transmitted.

Such sub-broadcast information structure is used in the no-ringing receiving function of the present invention. In the preferred embodiment, in the case where the destination telephone number is based on the NCNG signal, access information for identifying the presence or absence of the non-ringing receiving function of the accepting telephone number, may be sent as a train of data formed of such DTMF function signals as:

55#0 demarcated by the function signal "A" and the function signal "D" are transmitted.

When the telephone of the destination is based on the NRS signal, for example, access information for identifying the presence or absence of the non-ringing receiving function of the accepting telephone number, may be sent as a train of data formed of such DTMF function signal as:

55#1 demarcated by the function signal "A" and the function signal "D".

If the no-ringing dialing number corresponding to the no-ringing receiving function of the destination telephone number is dialed before the destination telephone number, the telephone service station transmits a no-ringing dialing signal to the destination. If the receiving side does not have the no-ringing receiving function, it cannot detect the dialing, and therefore, it cannot receive the signal.

Interactive television specifications may be used as the information related to the reply access data for identifying the presence or absence of the no-ringing receiving function. For example, a receiver which has a specification version of 00 (transmission rate: 300 bps), does not have a no-ringing receiving function. On the other hand, a receiver which has a specification version of 01 (transmission rate: 1200 bps), does not have a no-ringing receiving function.

In this instance, in order to indicate the reception of the reply from the "Tele-gong™" system, for example, a train of data formed of such DTMF function signals as:

44#1 demarcated by the function signal "A" at one end and the function signal "D" at the other end are transmitted.

As described above, the function signals "A", "B", "C" and "D", which are generally not used as telephone line selecting signals, are used to indicate the start and completion of the transmission of sub-broadcast information. Therefore, for example, even if sounds similar to DTMF sounds are transmitted during a broadcast program (e.g., a telephone call is placed by an actor during a drama scene), they will not be mixed up with information related to program. Thus, the sub-broadcast information can be transmitted and received accurately.

In recording a program by a VTR for rebroadcasting, information related to programs may be superimposed on the television signal utilizing idle horizontal scanning periods within the vertical blanking period. Since the DTMF signal is recorded as a sound, sub-broadcasting information is never changed or missed by the recording of programs at the broadcasting station.

Construction of Receiving Unit

Referring now to FIG. 1 and FIGS. 4 to 6, an embodiment of a receiving unit for use in two-way broadcasting according to the present invention is shown. The receiving unit is preferably applied to a television receiver and will be described below.

Figure 1:
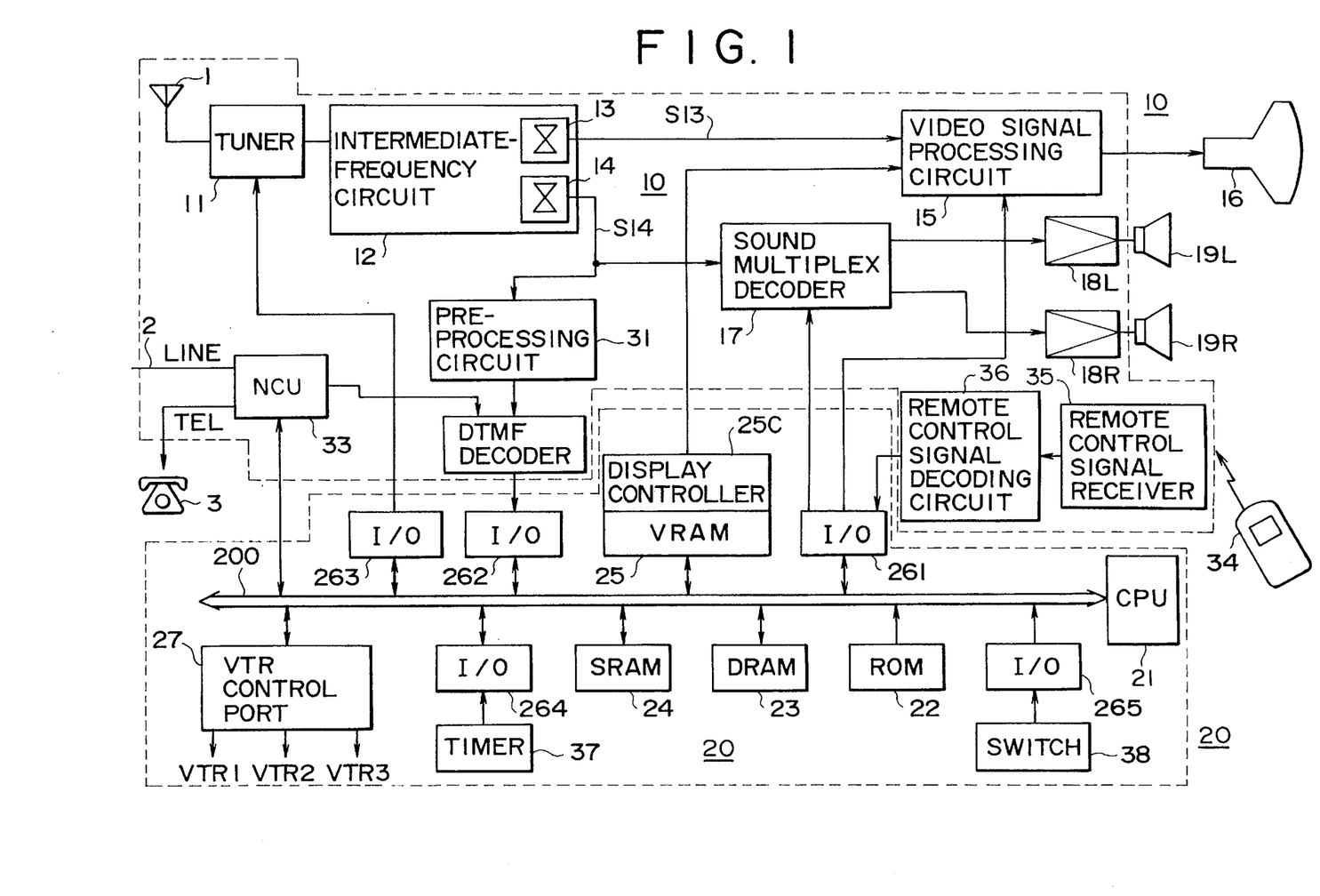
FIG. 1 is a block diagram showing a preferred embodiment of a receiving unit for a two-way broadcasting according to the present invention.

FIG. 1 shows a receiving unit for use in multiplex broadcasting in the present invention. The receiving unit comprises a signal system 10 and a control system 10.

A broadcast signal received by an antenna 1 is supplied to a tuner 11. A channel select signal from the I/O port 263 of control system 20 is also supplied to tuner 11. A broadcast signal of a desired channel is selected and converted to an intermediate-frequency signal in the tuner 11, and then said intermediate-frequency signal is supplied to an intermediate-frequency circuit 12. The intermediate-frequency circuit 12 preferably includes a video demodulator 13 and an audio demodulator 14 to thereby demodulate a video signal S13 and an audio signal S14.

The video signal S13 from the video demodulator 13 is supplied to an image receiving tube 16 through a video signal processing circuit 15, while the audio signal S14 from the audio demodulator 14 is supplied to a sound multiplex decoder 17. The multiplex decoder 17 decodes bilingual signals or stereo signals SL and SR. The signals SI, and SR may then be supplied to left and right speakers 19L and 19R through their respective amplifiers 18L and 18R.

The audio signal S14 from the audio demodulator 14 is also supplied to a DTMF decoder 32 through a processing circuit 31. The DTMF decoder 32 searches the input signal for a DTMF signal at all times, and when it detects a DTMF signal, decodes it to find out what function signal the DTMF signal indicates. More specifically, it decodes numeric data "0"–"9", "#", "*", "A"–"D" and supplies the decoded data to the control system 20.

In the present example, commonly available DTMF decoders such as those in electronics stores and the like may be employed as the DTMF decoder 32. The preprocessing circuit 31 can then be provided for performing preprocessing of the signal to achieve more accurate decoding of a DTMF signal for such DTMF decoders. More specifically, the preprocessing circuit 31 preferably comprises a filter circuit to eliminate frequency components other than a DTMF signal from the audio signal S14 so that the input signal to the DTMF decoder 32 becomes a signal which is acceptable by such a marketed DTMF decoder. The DTMF decoder 32 may comprise an inexpensive circuit such as a DTMF receiver chip. Since such chips comprise mass-produced integrated circuits, they provide inexpensive receivers.

In the present invention, there is provided a network control unit 33 (or NCU) 33 for complying with two-way broadcasting programs, for example replying to an audience participation program. Preferably this NCU comprises a modem.

A line connection terminal "Line" of the NCU 33 is connected with a telephone line 2 and a telephone terminal "Tel" is connected with a telephone receiver 3. The NCU 33 is connected to a system bus 200 of the control system 20 across which data from the NCU 33 is supplied to the DTMF decoder 32. Thus, the DTMF decoder 32 decodes the DTMF signal transmitted through the telephone line 2, and supplies the decoded data to the control system 20.

The control system 20 includes a CPU 21, a ROM 22, a DRAM 23, an SRAM 24, and a video RAM 25, which are all connected to the system bus 200. The ROM 22 stores various control programs including an accepting and processing program of DTMF data described later and, further stores fonts and graphics for displaying, and those dial numbers associated with non-ringing calls. The DRAM 23 is mainly used as work area for calculation, while the SRAM 24 stores setting information of the receiving unit itself and information for identifying its own television unit.

The video RAM 25 is used for displaying. The display controller 25C provided for the video RAM 25 controls the reading and writing of video data in the video RAM 25 and also converts the read data into an analog video signal. The analog video signal obtained from the display controller 25C is supplied to the video signal processing circuit 15, which is controlled by a control signal from the input/output of the port 261 control system 20. Thereby, the analog signal is superimposed on the video signal from the intermediate-frequency circuit 12 or combined therewith through switching.

The control system 20 further includes I/O pods 261, 262, 263, and 264 and a VTR control port 27. A control signal is supplied through the input/output port 261 to the video signal processing circuit 15 and the sound multiplex decoder 17. Further, in one embodiment, a remote control signal such as an infrared ray from a remote controller 34 may be received by a remote control signal receiver 35 and the received remote control signal then decoded in a remote control signal decoding circuit 36 the decoded remote control signal provided thereby is received by the control system 20 through the I/O port 261.

Control signals sent by the user via the remote controller 34 are processed by the CPU 21 according to a program stored in the ROM 22. For example, when a remote control operation for channel selection or volume control is made, tuner selection or volume control is executed and, at the same time, the font data for displaying necessary characters and symbols are read from the ROM 22 and transferred to the video RAM 25. Data from the video RAM 25 are then supplied to the video signal processing circuit 15 and combined therein with the video signal S13 (and, for example, superimposed on same). The data is thereby displayed on the screen of the image receiving tube 16 for a suitable period of time.

The data for channel selection or volume control is preferably written into the nonvolatile SRAM 24 each time the operation therefor is made. As a result of the last memory function of the SRAM, when power is turned off and then turned back on, the channel and volume selected immediately before the power was cut are selected.

A channel select signal is supplied to the tuner 11 through the I/O port 263. Time data from a timer circuit 37 for providing the correct time or for generating an interrupt signal for a designated period of time is input to the control system 20 through the I/O port 264.

The VTR control port 27 is preferably designated such that the controls for 3 inputs, e.g., VTR1, VTR2, and VTR3, are possible. The control system 20 supplies a control signal to a VTR through the control port 27 and receives a status signal from the VTR performing the desired control of the VTR.

In such a case, each of the VTRs incorporates a tuner and an intermediate-frequency circuit, said VTRs being connected to the antenna 1 through, for example, a distributor, for reservation of recording under the control of the control system 20 as described later.

In this embodiment, a switch 38 is provided for setting the availability of the no-ringing dialing function described above, said switch being connected to the I/O port 265. The receiver is connected to the switch 38 through the line 2. Namely, the switch 38 is previously set by the viewer depending on whether or not the telephone service station in the area where the receiver is provided has the no-ringing dialing service.

As will be later described in detail, during transmission, the operating state of the switch 38 is connected to the control system 20 through the I/O port 265 so that the control system 20 may check whether or not the telephone service station in the area where the receiver is provided has the no-ringing dialing service.

Reception of Multiplex Information.

Figure 4:
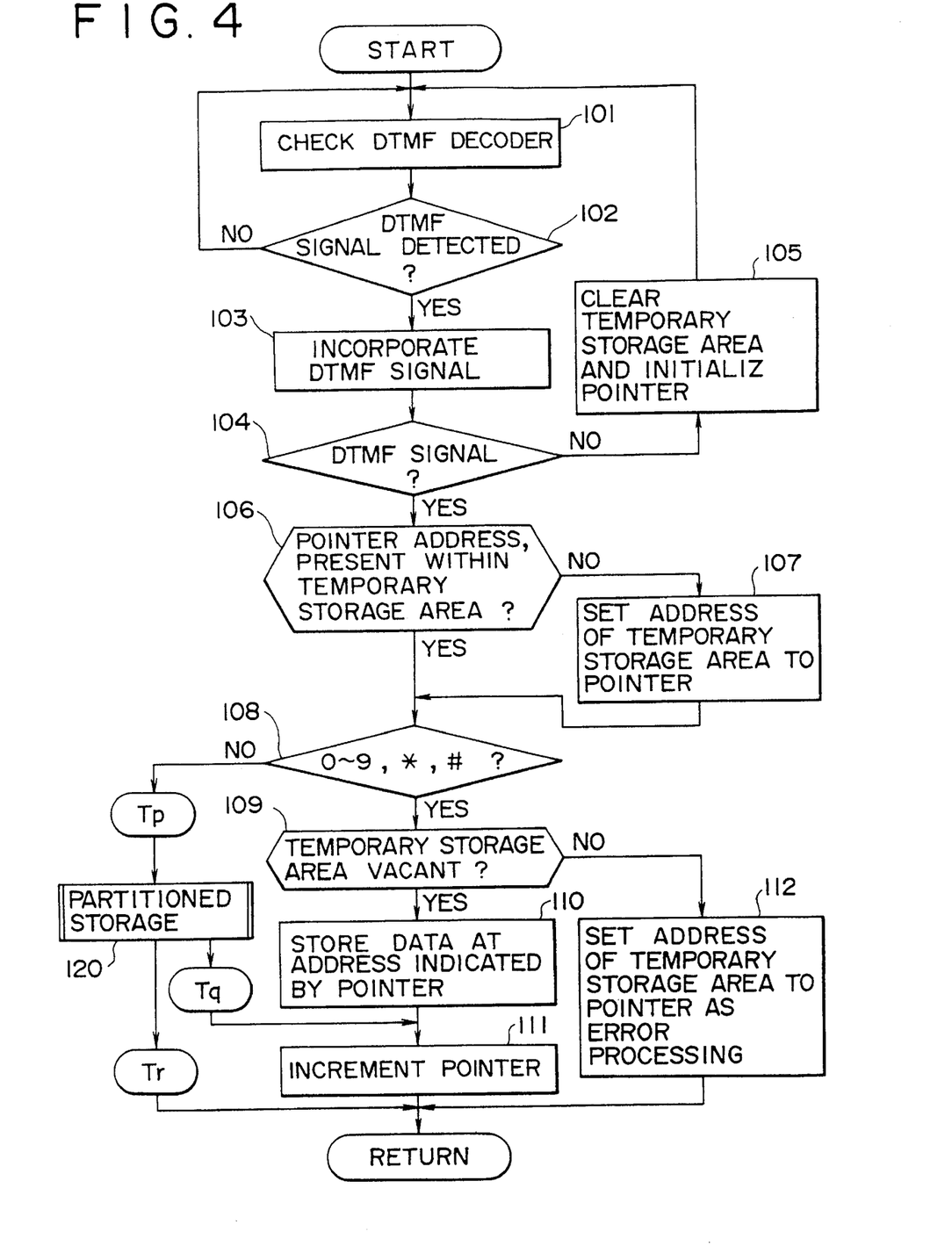
FIG. 4 is a flow chart explaining the receiving operation of sub-broadcast information on the basis of the DTMF signal of FIG. 2.
Figure 5:
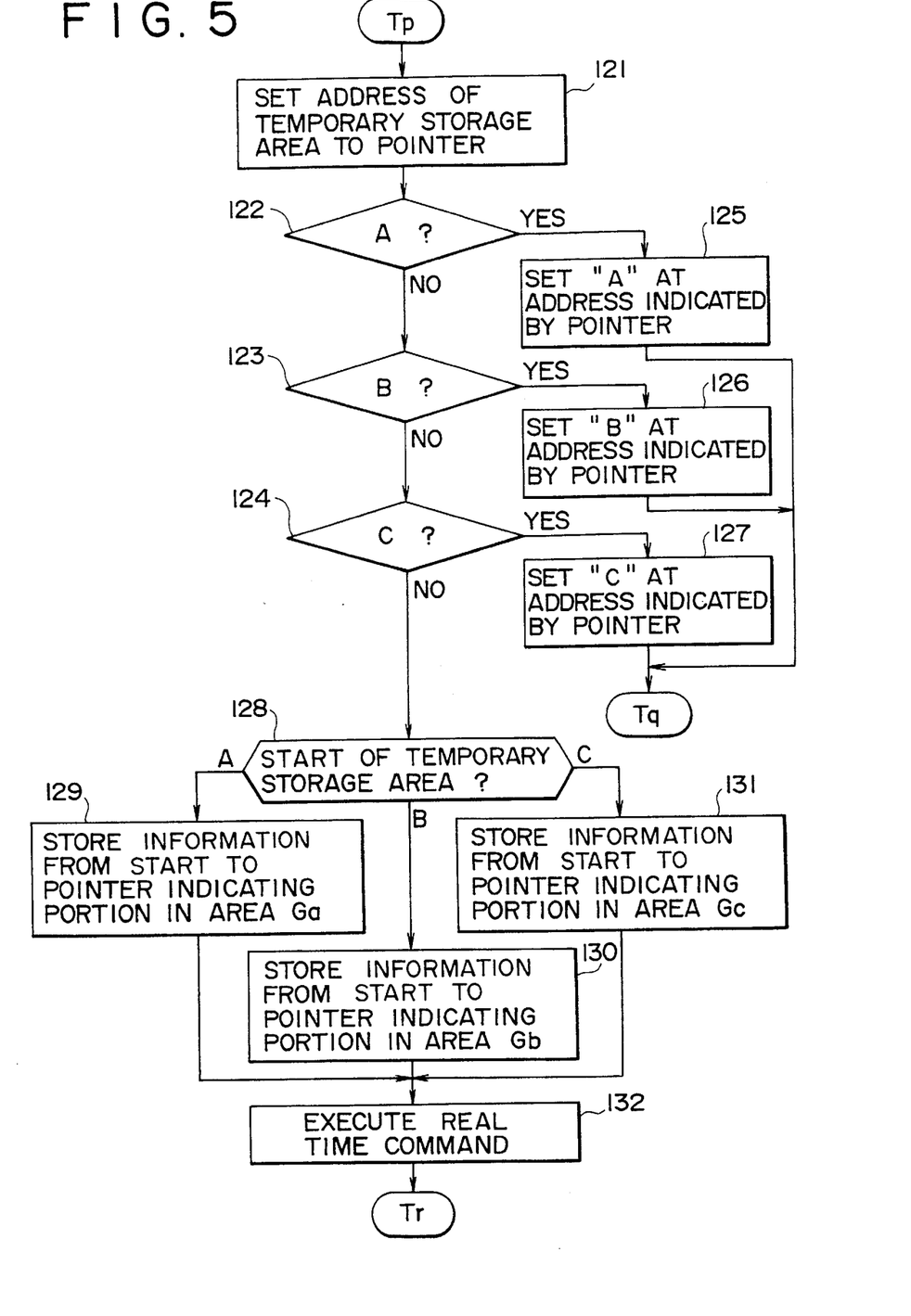
FIG. 5 is a detailed flow chart explaining the partitioned storage subroutine 120 of FIG. 4; and, FIG. 6 is a flow chart explaining the replying operation of the two-way broadcast program of FIG. 1.

Referring further to FIGS. 4 and 5, the reception of the multiplex information by the receiver shown in FIG. 1 will be described below.

When the television receiver power supply is turned on, DTMF signals mixed with the audio signals of a selected channel are monitored at all times using the preprocessing circuit 31 and the DTMF decoder 32. At step 101, the CPU 21 searches the output of the DTMF decoder 32 through the I/O port 262; either continuously or at specified periods. When CPU 31 detects that the DTMF signal is mixed in an audio signal S14 in the received broadcasting program (step 102) the program proceeds to the step 103 at which point the decoded output of the DTMF signal is interpreted as numeric or symbolic data as described above.

At step 104, the detected signal is checked for the DTMF signal by examining the specified transmitting conditions shown in FIG. 3, that is, as to whether or not the signal transmitting time is more than 50 msec, the minimum pause is more than 30 msec, and the period of the DTMF signal (signal transmitting time+minimum pause) is more than 120 msec. (Again, U.S. specifications are different; in a U.S. system the detected signal would be checked in accordance with U.S. specifications). This makes it possible to prevent receiving error data due to the potentially poor reception quality of broadcast signals. This step further makes it possible to prevent error in the reception of components which have the same frequency as that of the DTMF signals but which are non-DTMF signals (e.g. components contained in the sound broadcast as part of a television program).

If the received data is not a DTMF signal, the program proceeds to the step 105 at which point the temporary storage area of the DRAM 23 is cleared and a storing pointer is initialized. The program is then returned to the step 101 at which point the output of the DTMF decoder 32 is again continuously (or periodically) checked.

However, if the received data is indeed a DTMF signal meeting the aforementioned specifications, the program proceeds to step 106 at which point it is checked whether or not the storing point address is within the temporary storage area. If the storing pointer address is not within the temporary storage area, this indicates that the receiver is in the state directly after power was turned off, or directly after an error state and, therefore, the program proceeds from the step 106 to the step 107. At this point, the storing pointer is initialized or reset to the address of the temporary storage area. This makes it possible to prevent writing of data in the DRAM 23 in cases where the address indicated by the storing pointer is indeterminate; and hence to prevent malfunctions or software errors.

When the pointer address is checked within the temporary storage area at step 106, or when the pointer is initialized to the address of the temporary storage area at step 107, the program then proceeds to step 108 at which CPU 21 checks whether or not the received data are numeric data comprising "0"–"9", or symbolic data comprising "#" and "*" If the received data comprises these numeric and symbolic data, the program proceeds from step 108 to step 109 at which point it is checked whether or not there is a vacant location in the-temporary storage area.

When the received data are these numeric or symbolic data and a vacant location remains in the temporary storage area, the program proceeds to step 110 at which point the received data ("0–""9", "#", "*") are then stored in the address of the temporary storage area of the DRAM 23 indicated by the pointer. After that, the program proceeds to the step 111 at which the pointer is incremented by one character. The program is then returned to the step 101 at which the reception of the DTMF signal is again continuously (or periodically) checked.

If there is no vacant location in the temporary storage area at the step 109, there is a reception error. The program then proceeds to step 112 at which point the temporary storage area is cleared, and the pointer is initialized to the address of the temporary storage area.

If the received data are not numeric and/or symbolic data of ("0"–"9", "#", "*"), they are judged as one or more of the character data "A", "B", "C" and "D" corresponding to the above-described four function signals and, thereafter the program proceeds to a partitioned storage routine 120 shown in FIG. 4.

Reference will now be made to FIG. 5 which shows the routine 120 in further detail. At the step 121, the header address of the temporary storage area is set to the pointer. At steps 122, 123 and 124, the received data are sequentially checked to determine whether or not they comprise any of the function signals "A", "B", "C" and "D".

If the received data comprise the function signal "A", the program proceeds to step 125, at which point the character data [A] are written to the address indicated by the pointer. If the received data comprise the function signal "B", the program proceeds to the step 126, at which point the character data [B] are written to address indicated by the pointer. Finally, if the received data comprise the function signal "C", the program proceeds to the step 127, at point which the character data [C] are written to the address indicated by the pointer.

Following steps 125, 126 and 127, the program proceeds to step 111 at which the pointer is incremented by one character. The program is then returned to the step 101 at which the receiving of the DTMF signal is continuously checked.

If the received data are not any of the three function signals "A", "B" and "C", they are judged as the remaining function signal "D", and the data stored in the temporary storage area are then processed as a train of data or information group.

Since the broadcasting side sends either of the function signals "A", "B" and "C" as the transmission start signal upon the transmission of the DTMF signal, one of the character data [A], [B] and [C] is stored at the start of the temporary storage area as a result of the processing at steps 125 to 127. Then, at step 128, it is checked whether or not the start of the temporary storage area is either of the character data [A], [B] and [C].

As a result of this checking, when the start of the temporary storage area is the character data [A], the program proceeds to the step 129, at which point a train of data (starting from the beginning of the temporary storage area to the final location indicated by the pointer) are stored in the corresponding storage area Ga. When the start of the temporary storage area is the character data [B], the program proceeds to step 130, at which point a train of data (starting from the beginning of the temporary storage area to the final location indicated by the pointer) are stored in the corresponding storage area Gb. Finally, when the start of the temporary storage area is the character data [C], the program proceeds to step 131, at which point a train of data (starting from the beginning of the temporary storage area to the final location indicated by the pointer) are stored in the corresponding storage area Gc. As described above, these storage areas Ga, Gb and Gc are set in the DRAM 23, or SRAM 24.

The temporary information corresponding to a two-way broadcast program relating to reply access or the like is considered to be cleared upon reception of the program clear signal; however, since the user may switch channels upon the reception of a clear signal, it is desirable to clear the old number at a time when power is cut-off. Accordingly, the information relating to reply access may be stored in the DRAM 23 as it is. That is, the storage area Ga may be set in the DRAM 23. On the other hand, as described above, information relating to the environmental setting contains time information for reserving the reception or recording of a broadcast program. Unlike the reply access information, the time information of the reserved program must be stored for a relatively longer period of time, for example over one week. Accordingly, the information is desirable to be transferred to the nonvolatile SRAM 24. In this embodiment, the storage areas Ga, Gb and Gc are set either in the volatile DRAM 23 or in the nonvolatile SRAM 24 depending on the characteristics of the data to be stored; that is, depending upon whether the data needs to be stored for a long period of time or whether it can be erased upon power cut-off.

After the train of data Ga, Gb, or Gc is stored, the program proceeds to step 132, at which point the train of the received data is evaluated and analyzed. When the information stored in the storage areas Ga, Gb and Gc are commands of the type which must be executed upon the reception of signals, the processing steps corresponding to those commands are performed at step 132, e.g., clearing of all or part of the received information, setting of the current time to a timer circuit 37, and/or selective display of menu. The program is then returned to the step 101 at which the reception of the signal is again continuously (or periodically) checked.

As described above, during reception of the multiplex data in this embodiment, audio signals of the broadcasting programs are monitored at all times, and trains of data demarcated by the character data [A] and [D], [B] and [D], and/or [C] and [D], although regarded as independent information, are partitioned according to the kind of the information, and automatically stored in the different storage areas Ga, Gb and Gc, respectively. Thus, in this embodiment, the received data are classified and stored.

(Thus, for example, a train of data having the function signal "A" at the heading is stored in the storage area Ga as information relating to reply access to a two-way broadcast program. A train of data having the function signal "B" at the heading is stored in the storage area Gb as the information relating to the environmental setting of a two-way broadcast program. Further, a train of data having the function signal "C" at the heading is stored in the storage area Gc as the information relating to the clearing of received data of a two-way broadcast program.)

In the reply process described later, a simplified version of interactive television using a common telephone line for the transmission of information to a center station, the necessary information such as the telephone number of the destination and the communication condition is stored in the storage area Ga in the DRAM 23 so that it can be automatically read and utilized.

Even in cases of recording reservations the time information of the reserved program stored in the storage area Gb transferred from the DRAM 23 to the SRAM 24 can be automatically read and utilized.

Replying Process for Two-way Broadcasting

The reply process completed by the receiver of FIG. 1 will be described with reference to FIG. 6.

Figure 6:
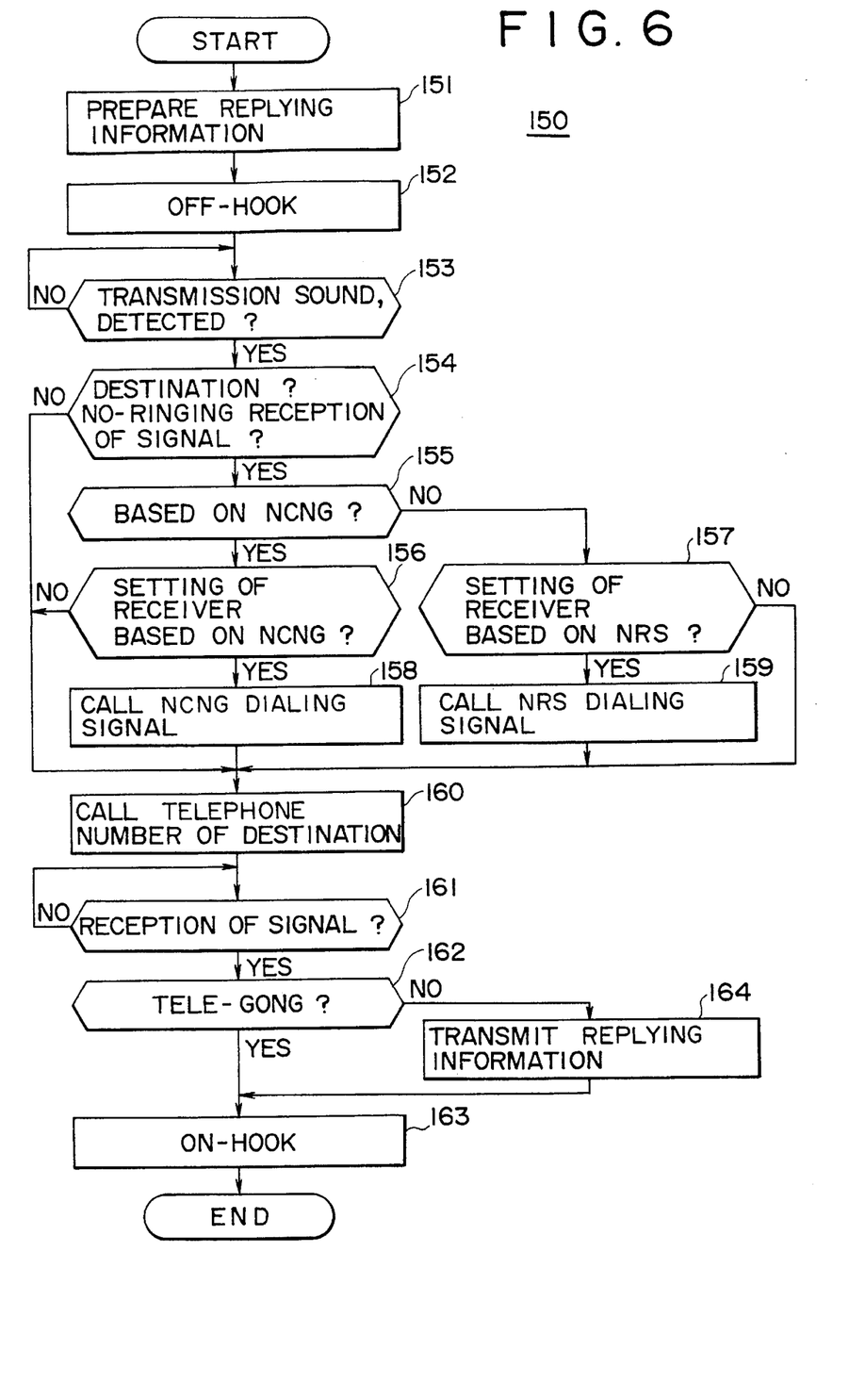

At step 151 in the reply routine 150 shown in FIG. 6, information for replying to a broadcast program is added with an ID number of the viewer, thus preparing the replying information. (As described above, in replying to the "Telegong™" system, the telephone number of the destination itself is the replying information.)

The telephone number of the telephone receiver 3 connected to the modem 33 is generally used as the ID number (identifying number) of the viewer. However, since it is possible that the viewer has not listed or published the telephone number, the ID number of the receiver determined on its production may be used, for example, as used in certain satellite broadcasting systems.

At step 152, the telephone receiver 3 is placed in the off-hook state. Then, at step 153, a dial tone is detected which informs that the dial number reception is prepared.

At step 154, it is checked whether or not the destination receiving equipment has the no-ringing receiving function on the basis of the above-described information relating to the reply access stored in the DRAM 23.

When it is determined that the destination receiving equipment has the no-ringing receiving function, the program proceeds to step 155, at which point it is checked whether the receiving equipment is based on the NCNG signal or NRS signal. When it is based on the NCNG signal, the program proceeds to the step 156. Conversely, when it is based on the NRS signal, the program proceeds to the step 157.

At either of the steps 156 and 157, the setting of the switch 38 (see FIG. 1) of the receiver in this embodiment is checked, and it is judged whether or not the telephone service station connected to the telephone line 2 provides the no-ringing dialing service.

If the telephone service station has the no-ringing dialing service, the program proceeds to the corresponding step 158 or 159 at which a special number (ID number) for no-ringing dialing on the basis of the NCNG signal or NRS signal is called through the modem 3. The numbers [161] or [162] may be used as the ID codes for the NCNG and NRS signals.

At the step 160, the telephone number of the specified destination stored in the DRAM 23 is called through the modem 33.

When it is determined that the receiving equipment of the destination does not have the no-ringing receiving function at step 154, and when it is checked that the switch is set to indicate that the telephone service station does not provide no-ringing dialing service at the steps 156 and 157, the program proceeds to the step 160.

However, when the telephone service station connected to the telephone line 2 has the no-ringing dialing service, it dials the telephone number of the destination using the above-described NCNG signal (1300 Hz) or NRS signal (2080 Hz) according to the indication of the no-ringing dialing by the ID number. When there is no indication of no-ringing dialing by the ID number, the telephone service station dials the telephone number of the destination using the usual dial number (Cl) at 16 Hz.

In either case, only that telephone or receiving equipment having the no-ringing receiving function can receive the tone signal, and a telephone without the no-ringing receiving function cannot detect the dialing, and therefore, it cannot receive the 'signal.

Even in the case where a telephone number different from that of the destination is dialed due to the poor quality of the receiving state, the telephone is not rung, thereby preventing annoyance of a third person.

Furthermore, if the wrong telephone number is that of a facsimile having the no-ringing receiving function, the facsimile will process the signal as an error message, (due to the difference in facsimile protocol after signal reception) and attempt at transmission is ended.

At step 161, the reception of the signal is checked by determining via NCU 33, whether the ring back tone corresponding to the ringing is detected and whether the polarity of the line 2 is inverted.

When the reception of the signal is detected, the program proceeds to step 162 at which point it is checked whether or not the telephone number of the destination corresponds to the reply number sent by the broadcasting side. When it corresponds to this number, the program proceeds to step 163 at which point the telephone is immediately placed in the on-hook state, thus completing the reply process.

When the telephone number of the destination does not correspond to the number, the program proceeds to step 164 at which point reply information is transmitted. Then, at step 163, the telephone is placed in the on-hook state.

The transmitting side of the two-way broadcast system receives signals and counts the number of replies on the telephone service side, and therefore, such system, the reception of a signal means the end of the reply transmission. Accordingly, the telephone is immediately placed in the on-hook state directly after the reception of the signal.

As described above, when compared with the case of manual cut-off of the line and the case of cut-off of the line on the transmitting side, the period of time during which a load is applied to the telephone service line station on the receiving side is shortened, for example order of from 10 sec or more to 1 sec or less. Thus the load applied on the line is greatly reduced.

At step 153 or 161, time limit may be set, beyond which the telephone is placed in the on-hook state if no transmission sound is detected or signal received. An error message is also preferably displayed on the screen of the image receiving tube 16 for a specified time (not shown).

In the above embodiment, in the case where the broadcasting side transmits the information for identifying the presence or absence of the no-ringing receiving function of the destination, the receiving side transmits through a telephone service station, a dial signal corresponding to the function of a destination on the basis of the identifying information. The dialing signal is thus received only by the destination having the specified function, so that it becomes possible to prevent misdialing, and hence to avoid troubling a third person due to wrong dialing.

It also becomes possible by pre-setting the switch 38, to manually dial a signal in the usual manner even in the case where a receiver is provided in an area where the telephone service station has older equipment.

With this arrangement, two-way broadcast program, at midnight or later can be envisioned.

In the case where the broadcasting side transmits information identifying the presence or absence of a plurality of destinations corresponding to a plurality of replies, the receiving side selectively dials a plurality of the destinations on the basis of the identifying information. At this time, since the transmission of the reply is substantially completed upon the reception of the signal, it becomes possible to immediately cut off the telephone line and hence to reduce the load applied on the line.

Second Embodiment

In another embodiment of the instant invention, the information related to two-way broadcast programs may be superimposed on an image signal utilizing idle horizontal scanning periods within the vertical blanking period. It may be also multiplexed as a sub-channel sound signal in voice multiplexed broadcasting. Moreover, in the case of multiplexed broadcasting using a signal in a different area from that of an image signal or sound signal as a main broadcast signal, the present invention may be applied only by changing the extraction of the multiplexed data and decoding processing.

The receiving unit for broadcast signals according to the present invention is applicable for satellite broadcasting or cable television broadcasting.

Although the destination has the no-ringing receiving function in the previous embodiment, the receiving side may also have the no-ringing receiving function. With this arrangement, the broadcasting side transmits a signal to the receiving side without ringing.

As described above, the present invention is effective with the television broadcasting station or the television receiver; however, insofar as the sub-broadcast comprises DTMF signals in a relatively narrow audio band area, and is broadcast while being multiplexed with a main broadcast audio signal, the present invention may be applied to AM and FM radio broadcasting as well as PCM sound broadcasting, and the receiving unit corresponding thereto.

As described above, according to the present invention, in the two-way broadcasting in which a reply is transmitted to the broadcasting side through a telephone line, the broadcasting side broadcasts a signal multiplexed with information for identifying the presence or absence of the no-ringing responsive function of the destination; and when the destination has the no-ringing responsive function, the receiving side dials the no-ringing dialing number corresponding to the function of the destination before the telephone number of the destination on the basis of the function identifying information. Thus, a telephone service station transmits the specified no-ringing dialing signal, and only the destination having the specified function can receive the signal, thus avoiding bothering a third person.

When the broadcasting side having a plurality of destinations corresponding to a plurality of replies broadcasts a broadcast signal multiplexed with the information for identifying the presence or absence of a plurality of the destinations corresponding to a plurality of the replies, the receiving side selectively dials a plurality of the destinations on the basis of the destination identifying information. At this time, upon the reception of the signal, the receiving side substantially completes the transmission of the replies and immediately cuts off the telephone line, thus reducing the load applied to the line.

What is claimed is:

1. In a two-way broadcasting system in which a broadcasting side broadcasts a broadcasting program requesting replies of viewers, and a receiving side transmits said replies, including reply information to a specified destination by way of a telephone line, said specified destination having a telephone number associated therewith, wherein:

said broadcasting side broadcasts a main broadcast signal multiplexed with identifying information for detecting the presence or absence of a no-ringing responsive function of said specified destination said no-ringing responsive function having a specified number associated therewith, and, said receiving side receives said broadcast signal and separates said identifying information from said received broadcast signal, and dials specified number corresponding to said no-ringing responsive function before the telephone number of said destination.

2. A receiving unit for two-way broadcasting, said receiving unit including means for transmitting reply information in response to a question proposed from a broadcasting side to a specified destination through a telephone line, comprising:

means for receiving a multiplexed signal, said multiplexed signal comprising a broadcast signal and information identifying the presence or absence of a no-ringing responsive function of said destination;

means for separating said no-ringing responsive function identifying information from said broadcast signal;

means for incorporating said separated responsive function identifying information, whereby a specified number corresponding to said no-ringing responsive function is dialed before the telephone number of said destination on the basis of said incorporated information.

3. The receiving unit of claim 2, wherein said receiving side dials to said destination determined to have said no-ringing responsive function on the basis of said responsive function identifying information, a-specified number for performing a call based on an NCNG signal before the telephone number of said destination.

4. A receiving unit for two-way broadcasting according to claim 2, wherein said receiving side dials to said destination to have said no-ringing responsive function on the basis of said responsive function identifying information, a specified number for performing a call based on an NRS signal before the telephone number of said destination.

* * * * *